(12) United States Patent
So

(10) Patent No.: US 10,094,509 B2
(45) Date of Patent: Oct. 9, 2018

(54) BUILDING COMPONENTS AND STRUCTURES

(71) Applicant: Yu Shing So, Aberdeen (HK)

(72) Inventor: Yu Shing So, Aberdeen (HK)

(73) Assignee: WLS INTELLECTUAL PROPERTY LIMITED, Hong Kong (HK)

( * ) Notice: Subject to any disclaimer, the term of this patent is extended or adjusted under 35 U.S.C. 154(b) by 250 days.

(21) Appl. No.: 13/905,820

(22) Filed: May 30, 2013

(65) Prior Publication Data

US 2013/0319795 A1    Dec. 5, 2013

(30) Foreign Application Priority Data

Jun. 1, 2012    (HK) .................................. 12105370

(51) Int. Cl.
*E04G 5/04*       (2006.01)
*F16M 13/00*     (2006.01)
*E04G 3/32*       (2006.01)
*E04G 3/22*       (2006.01)
*E04G 25/06*     (2006.01)
*E04G 5/00*       (2006.01)
(Continued)

(52) U.S. Cl.
CPC .............. *F16M 13/00* (2013.01); *E04G 1/367* (2013.01); *E04G 3/22* (2013.01); *E04G 3/30* (2013.01); *E04G 3/325* (2013.01); *E04G 3/34* (2013.01); *E04G 5/001* (2013.01); *E04G 5/046* (2013.01); *E04G 25/065* (2013.01)

(58) Field of Classification Search
CPC E04G 5/04; E04G 5/001; E04G 5/046; E04G 5/00; E04G 1/36; E04G 1/362; E04G 1/365; E04G 1/367; E04G 3/30; E04G 3/28; E04G 2003/286; E04G 3/305; E04G 3/32; E04G 3/325; E04G 21/26; E04G 17/12; E04G 17/14; E04G 19/003; E04G 21/3219; E04G 2017/0601; E04G 17/06; E04B 2002/8688; B63B 59/06; B63C 5/02; B63C 2005/022; B63C 2005/025; B63C 2005/027; B66B 7/04; B66B 7/024; B66B 11/028; B66B 11/0286; B66B 7/046; B66B 7/047; B66B 9/187
See application file for complete search history.

(56) References Cited

U.S. PATENT DOCUMENTS 1,090,856 A  *  3/1914  Johnson ........................ 182/129
1,195,488 A  *  8/1916  Marshall ................. E04G 7/307
                                                                    182/186.7

(Continued)

FOREIGN PATENT DOCUMENTS

DE        3713545 A1  * 10/1987  ............... E04G 3/24
EP        1624132 A1  *  2/2006  ............... E04G 5/00
(Continued)

*Primary Examiner* — Daniel P Cahn
(74) *Attorney, Agent, or Firm* — Ostrolenk Faber LLP

(57) ABSTRACT

An extendible lateral support arm having at least two elongate arm members coupled together and displaceable relative each other. The first arm defines a first end of the extendible arm. The second arm defines a second end of the extendible arm. The distance between the first end and the second end is variable. The first end presents a first head that can engage a building structure. The second end presents a second head that can be secured to an adjacent structure.

22 Claims, 6 Drawing Sheets

(51) Int. Cl.
   *E04G 1/36*    (2006.01)
   *E04G 3/30*    (2006.01)
   *E04G 3/34*    (2006.01)

(56) References Cited

U.S. PATENT DOCUMENTS

| | | | | |
|---|---|---|---|---|
| 1,297,992 A * | 3/1919 | Borcherdt | ............... | B66B 17/34 187/357 |
| 1,432,040 A * | 10/1922 | Schuler | ............... | 182/145 |
| 2,541,556 A * | 2/1951 | Stinson | ............... | 182/144 |
| 2,848,069 A * | 8/1958 | Sanders | ............... | B66B 17/34 187/360 |
| 3,095,060 A  | 6/1963 | Reinhardt | ............... | 182/12 |
| 3,630,315 A * | 12/1971 | Meyer | ............... | E04G 3/30 182/142 |
| 3,773,143 A * | 11/1973 | Del Prete | ............... | E06C 7/484 182/214 |
| 3,783,819 A * | 1/1974 | Hammelmann | ........ | B63B 59/06 118/305 |
| 3,911,849 A * | 10/1975 | Hammelmann | ...... | B05B 13/005 114/222 |
| 3,951,092 A * | 4/1976 | van den Broek | ....... | B63B 59/06 114/222 |
| 3,998,294 A * | 12/1976 | Moeller | ............... | 182/229 |
| 4,058,184 A * | 11/1977 | Stuart | ............... | E04G 1/36 182/128 |
| 4,120,378 A * | 10/1978 | Mills | ............... | E04G 3/30 182/128 |
| 4,125,174 A * | 11/1978 | Lienhard | ............... | 182/128 |
| 4,140,414 A * | 2/1979 | Buttgereit | ............... | A47B 57/50 211/182 |
| 4,164,268 A * | 8/1979 | Jones | ............... | E04G 3/30 182/129 |
| 4,177,915 A * | 12/1979 | Blankenburg | ............ | E04H 7/06 228/184 |
| 4,274,590 A * | 6/1981 | Hammelmann | ........ | B63B 59/06 239/750 |
| 4,311,207 A * | 1/1982 | Lurry | ............... | E06C 1/345 182/107 |
| 4,394,887 A * | 7/1983 | Spinks | ............... | E06C 7/48 182/107 |
| 4,445,451 A * | 5/1984 | van den Broek | ....... | B63B 59/06 114/222 |
| 4,453,619 A * | 6/1984 | Bierman | ............... | 182/142 |
| 4,542,804 A * | 9/1985 | Power | ............... | A62B 1/02 182/150 |
| 4,549,634 A * | 10/1985 | Duncan | ............... | E04G 7/307 182/186.8 |
| 4,615,412 A * | 10/1986 | Clarke | ............... | E06C 7/482 182/107 |
| 4,650,035 A * | 3/1987 | Eubanks | ............... | E06C 7/12 182/101 |
| 4,671,382 A * | 6/1987 | D'Alessio | ............... | E04G 1/36 182/128 |
| 4,705,142 A * | 11/1987 | Peterson | ............... | A62B 1/02 182/150 |
| 4,754,843 A * | 7/1988 | Anderson | ............... | E06C 7/48 182/129 |
| 4,869,345 A * | 9/1989 | Nilsen | ............... | E06C 9/12 182/163 |
| 4,899,847 A * | 2/1990 | Lufkin | ............... | E04G 1/24 182/129 |
| 4,960,185 A * | 10/1990 | Thiem | ............... | 182/38 |
| 4,993,913 A * | 2/1991 | Ohtsuki | ............... | B25J 5/00 180/901 |
| 5,065,838 A * | 11/1991 | Finley | ............... | E04G 3/34 182/142 |
| 5,148,635 A * | 9/1992 | Porter | ............... | B23P 6/002 451/296 |
| 5,181,825 A * | 1/1993 | Sugitani | ............... | B66C 1/16 187/900 |
| 5,326,065 A * | 7/1994 | Jackson | ............... | E04G 5/02 248/351 |
| 5,388,661 A * | 2/1995 | Hood, Jr. | ............... | 182/3 |
| 5,423,398 A * | 6/1995 | Brown | ............... | E04G 3/34 182/142 |
| 5,685,767 A * | 11/1997 | Burds | ............... | B24C 3/06 451/439 |
| 5,778,999 A * | 7/1998 | Nealeigh | ............... | E04G 21/28 182/129 |
| 5,807,168 A * | 9/1998 | Goldbach | ............... | B05B 13/005 118/313 |
| 5,909,783 A * | 6/1999 | Berish | ............... | E04G 1/20 182/136 |
| 6,102,157 A * | 8/2000 | Goldbach | ............... | B05B 13/005 182/128 |
| 6,250,424 B1* | 6/2001 | Laug | ............... | E06C 1/34 182/107 |
| 6,394,227 B1* | 5/2002 | Frestad | ............... | 182/82 |
| 6,722,471 B2* | 4/2004 | Wolfe | ............... | E04G 5/10 182/178.5 |
| 6,913,114 B1* | 7/2005 | Blehm | ............... | E04D 15/00 182/104 |
| 7,077,239 B1* | 7/2006 | Hayman | ............... | E04G 1/15 182/113 |
| 8,534,420 B1* | 9/2013 | Michael | ............... | A62B 1/02 182/141 |
| 8,579,084 B2* | 11/2013 | Becker | ............... | E04G 3/24 182/128 |
| 8,596,414 B1* | 12/2013 | Lown | ............... | E04G 3/265 182/45 |
| 9,103,080 B2* | 8/2015 | Jolicoeur | ............... | E01D 19/106 |
| 2002/0036118 A1* | 3/2002 | Ono | ............... | E04G 1/06 182/178.1 |
| 2003/0033772 A1* | 2/2003 | Russell | ............... | E04B 1/3404 52/292 |
| 2003/0034576 A1* | 2/2003 | Russell | ............... | E04B 1/3404 264/33 |
| 2003/0079420 A1* | 5/2003 | Klassen | ............... | E04G 1/14 52/127.2 |
| 2004/0231922 A1* | 11/2004 | Schwoerer | ............... | E04G 1/15 182/178.1 |
| 2005/0072631 A1* | 4/2005 | Tracey | ............... | E06C 1/34 182/127 |
| 2005/0167556 A1* | 8/2005 | Fontana | ............... | A63B 27/00 248/231.91 |
| 2005/0189172 A1* | 9/2005 | Becker | ............... | E04G 5/10 182/106 |
| 2005/0247008 A1* | 11/2005 | Fujiwara | ............... | E04G 1/20 52/651.1 |
| 2006/0005760 A1* | 1/2006 | Argitis | ............... | B60P 3/1066 114/364 |
| 2006/0096050 A1* | 5/2006 | Simonette | ............... | B08B 3/024 15/103 |
| 2006/0174830 A1* | 8/2006 | van Houten | ............... | B24C 3/062 118/306 |
| 2006/0225960 A1* | 10/2006 | Ferlin | ............... | E04G 1/15 182/138 |
| 2007/0205051 A1* | 9/2007 | Yang | ............... | E04G 3/28 182/128 |
| 2010/0224447 A1* | 9/2010 | Rogers | ............... | E04G 5/08 182/222 |
| 2011/0047895 A1* | 3/2011 | Finch | ............... | E04G 21/26 52/126.1 |
| 2011/0079698 A1* | 4/2011 | Pezzimenti | ............... | E04G 21/26 248/354.5 |
| 2011/0173918 A1* | 7/2011 | Graham | ............... | E04G 21/26 52/693 |
| 2011/0262215 A1* | 10/2011 | Thacker | ............... | E04G 7/307 403/81 |
| 2011/0272212 A1* | 11/2011 | Trant | ............... | 182/129 |
| 2012/0006621 A1* | 1/2012 | Casanova | ............... | B66B 19/00 182/141 |
| 2012/0042495 A1* | 2/2012 | Bacon | ............... | E04G 25/06 29/428 |
| 2012/0168250 A1* | 7/2012 | Baglin | ............... | E06C 7/16 182/113 |
| 2012/0193591 A1* | 8/2012 | Huang | ............... | B66F 1/06 254/100 |

(56) References Cited

U.S. PATENT DOCUMENTS

| | | | | |
|---|---|---|---|---|
| 2012/0216476 A1* | 8/2012 | Naidoo | ...................... | E04B 1/14 |
| | | | | 52/309.4 |
| 2012/0228060 A1* | 9/2012 | Rogers | ...................... | E04G 1/06 |
| | | | | 182/178.5 |
| 2013/0074432 A1* | 3/2013 | Ciuperca | .................. | E04B 1/21 |
| | | | | 52/309.4 |
| 2013/0206506 A1* | 8/2013 | Keersmaekers | .......... | E04G 1/15 |
| | | | | 182/36 |
| 2014/0109932 A1* | 4/2014 | Lange | ...................... | A47L 1/02 |
| | | | | 134/6 |
| 2014/0255086 A1* | 9/2014 | Wallther | .................. | E04G 7/32 |
| | | | | 403/205 |
| 2014/0325825 A1* | 11/2014 | Hayman | ................ | E04G 5/061 |
| | | | | 29/525.01 |
| 2015/0023726 A1* | 1/2015 | Thacker | ................. | E04G 7/307 |
| | | | | 403/49 |
| 2015/0075910 A1* | 3/2015 | Thacker | .................... | E04G 5/04 |
| | | | | 182/229 |
| 2016/0024808 A1* | 1/2016 | Andree | ................ | B21D 41/026 |
| | | | | 249/207 |

FOREIGN PATENT DOCUMENTS

| | | | | | |
|---|---|---|---|---|---|
| EP | 1731692 A1 | * | 12/2006 | ............. | E04G 1/06 |
| JP | 61272602 A | * | 12/1986 | | |
| JP | 01178666 A | * | 7/1989 | | |
| JP | 08333885 A | * | 12/1996 | | |
| JP | 2004100192 A | * | 4/2004 | | |
| JP | 2005232773 A | * | 9/2005 | | |

\* cited by examiner

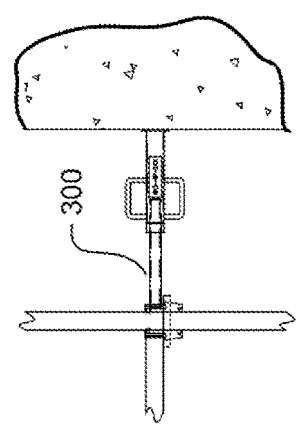
FIGURE 8
FIGURE 7
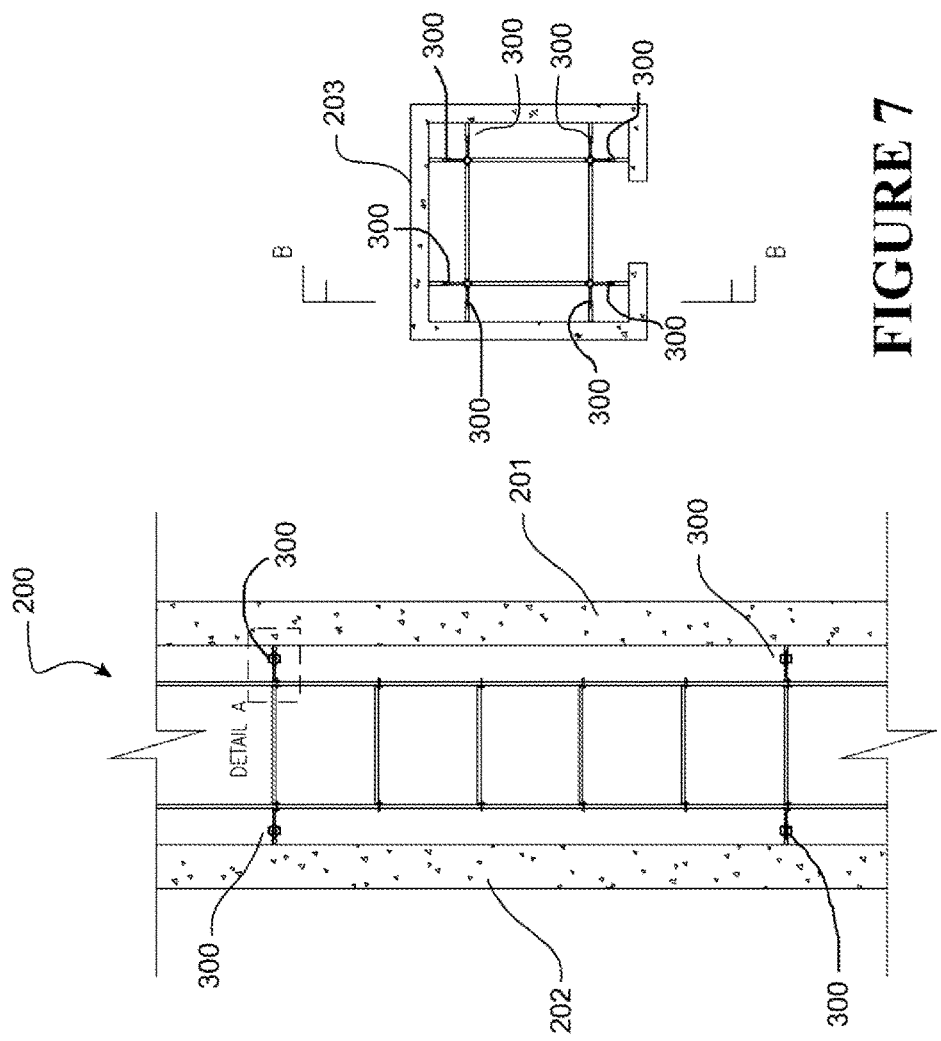
FIGURE 6

BUILDING COMPONENTS AND STRUCTURES

FIELD OF THE INVENTION

The present invention relates to improvements in building components and structures.

BACKGROUND

For building elements located adjacent a building structure, it may be important for the building element to be connected, at least from time to time, in a manner to gain some stability from the building structure. This may be important to stop the building element from hitting the building structure, gain lateral support from the building structure and/or provide stability to the element.

For example, for scaffolding erected adjacent a building structure or more particularly for a scaffolding erected inside an elevator shaft of a building, it is important for the scaffolding to be tied to the building so as to receive some stability from the building structure. In particular, lateral stability.

To achieve this support from a building structure short arms are typically used to extend between the scaffolding and the walls of the elevator shaft. Towards one end of a short arm a clamp coupling is usually used to secure the short arm to a ledger or standard of the scaffolding structure. The other end of the arm may be provided with an anchoring plate adapted to be bolted to a wall of the elevator shaft. Disadvantages of this way of laterally stabilising a scaffold structure include:

a) a significant amount of work is required to connect the short arms to the scaffolding structure,
b) the arm may not be firmly secured to the scaffolding because of a loose clamp coupling,
c) short arms of different lengths may have to be used or may need to be trimmed onsite to ensure that it is of a suitable length for providing the lateral stability,
d) the scaffolding may still not be fully secured in a lateral direction as equal and opposite forces may need to be exerted onto the scaffolding in a horizontal direction in order to keep the scaffolding firmly positioned in the elevator shaft.

For other building elements located adjacent a building, support may be required from time to time from the building structure also. For example for a swing stage suspended adjacent a building and that may travel up and down a building for maintenance, window cleaning and similar, the swing stage may be desirous of contacting with the building to reduce the degree of undesired movement of the swing stage. Such support will need to cater for the fact that the swing stage travels up and down relative the building.

It is accordingly an object of the present invention to provide improvements in building components and structures that at least address one or more of the abovementioned disadvantages and/or to provide the public with a useful choice.

BRIEF DESCRIPTION OF THE INVENTION

Accordingly in a first aspect the present invention may be an extendible lateral support arm to span between a building structure and a structure adjacent, said extendible arm comprising at least two elongate arm members that are coupled together in a manner to be able to displace relative each other, a first of said elongate arm members (herein after "first arm") defining a first end of said extendible arm, another of the elongate arm members (herein after "second arm") defining a second end of the extendible arm, the distance between the first and second end able to be varied, and wherein at said first end said first arm presents a first head that can engage to said building structure, and wherein at said second end, said second arm presents a second head that can be secured to said structure adjacent.

Preferably the structure adjacent is a scaffold structure.

Preferably said scaffold structure comprises of a plurality of vertical standards that are interconnected by horizontal ledgers.

Preferably said structure adjacent is moveable relative said building structure.

Preferably said structure adjacent is moveable up and down relative said building structure.

Preferably said structure adjacent is a swing stage or service car.

Preferably the structure adjacent carries said support arm.

Preferably the structure adjacent carries a plurality of said support arms.

Preferably the first arm and second arm are coaxial each other.

Preferably said two elongate arms are threadingly coupled together to be able to displace relative each other.

Preferably the first and second arms are in threaded engagement to each other.

Preferably the first arm and second arm are in telescopic engagement with each other.

Preferably the first and second arms are engaged with each other in a turnbuckle manner.

Preferably said at least one of said first and second arms has dependent therefrom a lever that can be grasped by a person to assist in providing leverage during for the relative rotation of the first to the second arm.

Preferably the first arm comprises a pipe that includes an internally presented thread and said second arm comprises a threaded rod that is able to extend into said pipe.

Preferably the two arms are coupled together via an intermediate member.

Preferably at said first end said first arm presents a first head adapted and configured to be secured to said building structure.

Preferably the support arm is to be engaged to said structure adjacent that is moveable relative said building structure, said support arm able to be carried thereby as it moves relative the building structure, the first end of the support arm, to engage said building structure at least from time to time.

Preferably the first head comprises a contact roller.

Preferably the contact roller is mounted as a castor roller.

Preferably the first head comprises a castor wheel.

Preferably said structure adjacent is a scaffold structure and wherein at said second end, said second arm presents a second head that is adapted and configured to be secured to said scaffold structure.

Preferably the structure adjacent is a scaffold structure, said scaffold structure comprises of a plurality of vertical standards that are interconnected by horizontal ledgers each engaged at a rosette of said vertical standards, wherein at said first end said first arm presents a first head adapted and configured for securing to said building structure and wherein said second head comprises a connector adapted and configured to become secured to a said standard at a said rosette.

In a second aspect the present invention may be said to be a construction comprising a building structure and a structure adjacent and an extendible lateral support arm spanning between said building structure and structure adjacent, said extendible arm comprising at least two elongate arm members that are coupled together in a manner to be able to displace relative each other, a first of said elongate arm members (herein after "first arm") defining a first end of said extendible arm, another of the elongate arm members (herein after "second arm") defining a second end of the extendible arm, the distance between the first and second end able to be varied, and wherein at said first end said first arm presents a first head engaged to said building structure, and wherein at said second end, said second arm presents a second head secured to said structure adjacent.

Preferably the structure adjacent is a scaffold structure.

Preferably said scaffold structure comprises of a plurality of vertical standards that are interconnected by horizontal ledgers.

Preferably the structure adjacent is a scaffold structure, said scaffold structure comprises of a plurality of vertical standards that are interconnected by horizontal ledgers each engaged at a rosette of said vertical standards, wherein at said first end said first arm presents a first head adapted and configured for securing to said building structure and wherein said second head comprises a connector adapted and configured to become secured to a said standard at a said rosette.

Preferably said second head is secured to said scaffold structure.

Preferably said first head is secured to said building structure.

Preferably said first head comprises a mounting plate that comprises at least one aperture through which a fastener can extend to secure into said building structure.

Preferably the first and second arms are coaxial each other.

Preferably said two elongate arm members are threadingly coupled together to be able to displace relative each other.

Preferably the first and second arms are in threaded engagement with each other.

Preferably the first and second arms are in threaded engagement to each other.

Preferably the first and second arms are in telescopic engagement to each other.

Preferably said two elongate arm members are threadingly coupled together to be able to displace relative each other the first and second arms are engaged with each other in a turnbuckle manner.

Preferably the two arms are coupled together via an intermediate member.

Preferably said at least one of said first and second arms has dependent therefrom a lever that can be grasped by a person to assist in providing leverage during for the relative rotation of the first to the second arm.

Preferably the first arm comprises a pipe that includes an internally presented thread and said second arm comprises a threaded rod that is able to extend into said pipe.

Preferably said structure adjacent is moveable relative said building structure.

Preferably said structure adjacent is moveable up and down relative said building structure.

Preferably the structure adjacent is able to move relative the building and said support arm is engaged to said structure adjacent and carried thereby as it moves relative the building, the first end of the support arm, engaging said building structure at least from time to time.

Preferably said structure adjacent is selected from one of a swing stage and service car.

Preferably the structure adjacent carries said support arm.

Preferably the structure adjacent carries a plurality of said support arms.

Preferably the first head comprises a contact roller.

Preferably the contact roller is mounted as a castor roller.

Preferably the first head is a castor wheel.

In a further aspect the present invention may be said to be a scaffolding system, for use adjacent a wall of a building, that comprises a plurality of standards and a plurality of ledgers that can be connected together to form a scaffold structure adjacent said wall and at least one extendible arm comprising a first arm and a second arm said first arm having a first end that presents a fastener to allow said extendible arm to be engaged with said wall and said second arm having a second end at which said extendible arm can be secured to said scaffold structure, the first and second arms threadingly coupled together to allow the distance between the first and second end to be changed to vary the length of the extendible arm, the extendible arm able to be secured to said wall and to said scaffold structure to tie the two together so as to create lateral support to said scaffold structure from said wall.

Preferably the system is for use intermediate of two walls of a building wherein at least two of said extendible arms are provided the two extendible arms able to be secured to a respective of said two walls and each be secured to said scaffold structure, the variable length of the extendible arms allowing a lateral clamping force to be exerted by said two extendible arms on said scaffolding structure to thereby laterally support said scaffold structure between said two walls.

Preferably the walls are directly facing each other.

Preferably the walls are at an angle to each other.

Preferably the walls are the walls of an elevator shaft.

Preferably the standards each present, spaced along the length of the standard, a plurality of rosettes that each define a coupling zone, the second end of the second arm including a coupling that is complementary to the coupling zone of the rosette to allow said coupling to be secured to said rosette.

Preferably the rosette is of a kind that comprises a sheet metal body and through which a plurality of elongate slots extend, each slot extending radically relative to said standard, said coupling comprising a tongue that can nest or otherwise snugly locate in each said slot.

Preferably the walls are the walls of an elevator shaft and wherein the system provides the standards and ledger to create an at least single bay 3 dimensional scaffold structure that in plan view is substantially quadrilateral in shape, and wherein at least 4 extendible arms are provided one extendible arm to extend outwardly away from each side of scaffold structure to a proximate wall of said elevator shaft.

Preferably there are 8 extendible arms two arms to extend outwardly away from each side of scaffold structure to a proximate wall of said elevator shaft.

Preferably each extendible arm is to extend from a standard.

Preferably each extendible arm is to be engaged with a said standard.

Preferably each extendible arm is to be engaged with said standard at a rosette.

Preferably each extendible arm is to extend horizontally.

Preferably the extendible arm is, when engaged at said rosette, unable to swivel relative said standard.

Preferably the system is for use in a lift shaft of a building.

In yet a further aspect the present invention may be said to be a method of erecting a scaffold structure adjacent a building comprising:
(a) erecting at least in part a modular scaffolding structure that comprises a plurality of standards and a plurality of ledgers that can be connected together to form a scaffold structure adjacent building,
(b) connecting at least one extendible lateral support arm as claimed in claim 1 to said building and to said scaffold structure, said support arm adjusted if necessary in length, to span between said building and said scaffold structure.

Preferably the length of the support arm is adjusted when said support arm is connected to at least one of said scaffold structure and said building.

Preferably the length of the support arm is adjusted when said support arm is connected to both said scaffold structure and said building.

In a further aspect the present invention may be said to be a scaffolding erected using the system as herein before described.

Preferably said scaffolding is erected in a lift shaft of a building.

In yet a further aspect the present invention may be said to be a scaffold structure lateral support arm comprising at least two components that are threadingly engaged to thereby allow an adjustment in length of the support arm to be made to allow the arm to span varying distances between and be connected to a scaffold structure and an adjacent building.

Preferably the support arm has a scaffold engageable end and a building engageable end.

Preferably the ends are different.

Preferably the scaffolding engageable end is adapted to be engaged at a rosette of a standard of said scaffold structure.

In still a further aspect the invention may be said to be a lateral support arm comprising at least two components that are threadingly engaged to thereby allow an adjustment in length of the support arm to be made to allow the arm to project varying distances from a structure adjacent a building to or towards said building.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

BRIEF DESCRIPTION OF THE DRAWINGS

A preferred form of the present invention will now be described with reference to the drawings of which:

FIG. 6 is a sectional view of part of a building such as part of an elevator shaft within which a scaffold structure can be erected and taken at section BB of FIG. 7, FIG. 7 is a plan view of FIG. 6, FIG. 8 is a close up view of area A of FIG. 6 and how an extendable arm may be used to connect the scaffolding structure to an adjacent building structure.

DETAILED DESCRIPTION OF THE INVENTION

Figure 1:
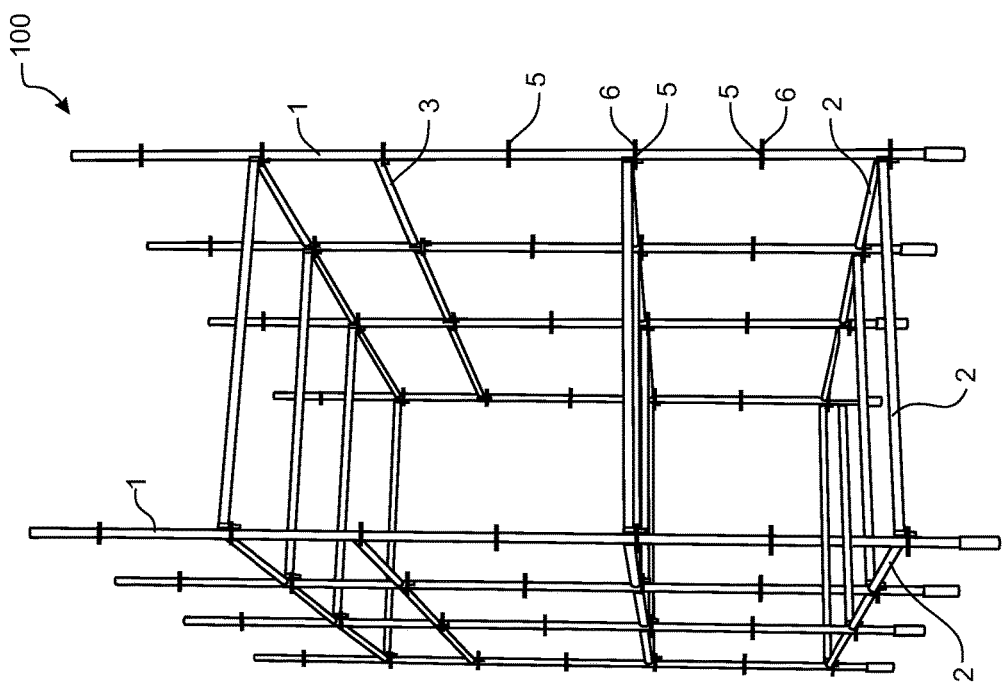
FIG. 1 is a perspective view of a scaffold structure comprising of a plurality of standards, ledgers and guard rails connected together as a modular system.
Figure 9:
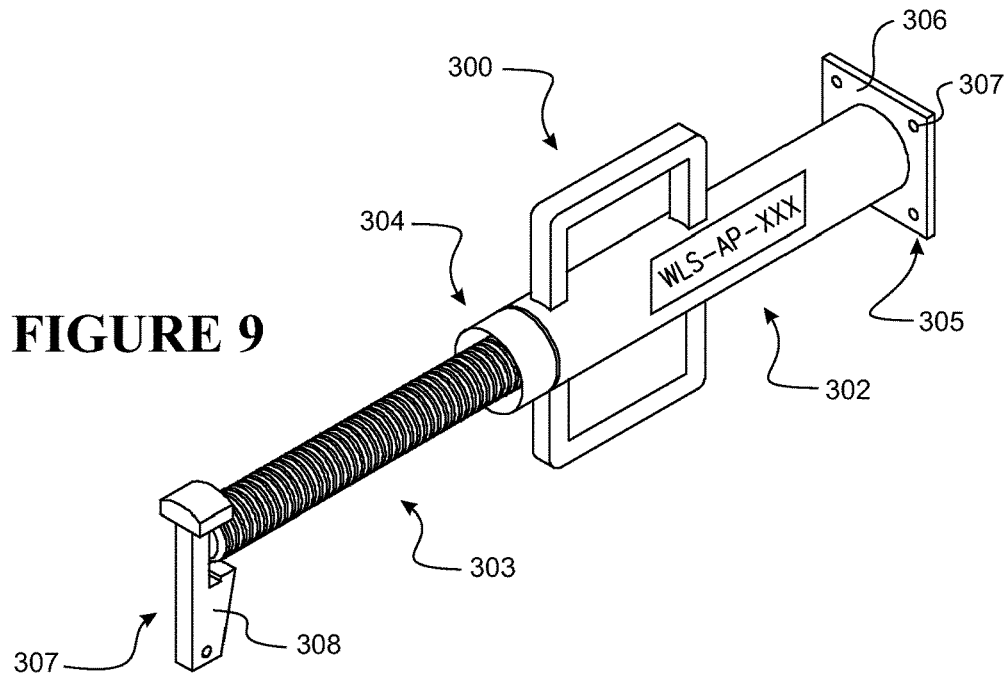
FIG. 9 is a perspective view of an extendable arm.
Figure 10:
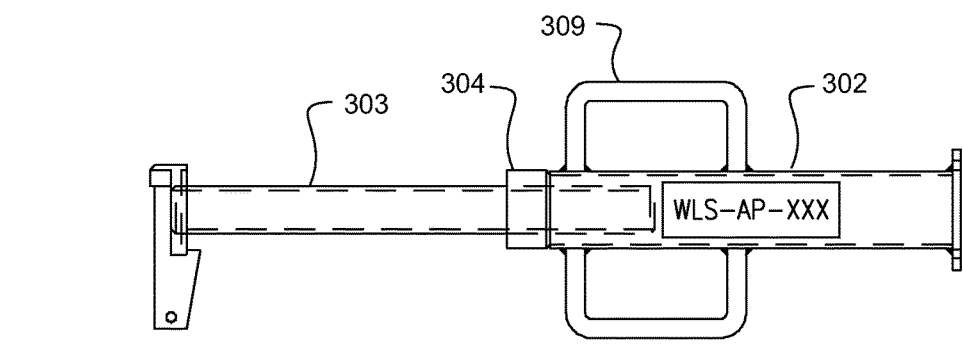
FIG. 10 is a side view showing some hidden detail of the extendable arm of FIG. 9.
Figure 11:
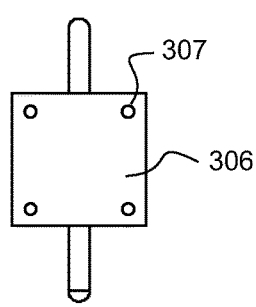
FIG. 11 is an end view of the arm of FIG. 10.
Figure 12:
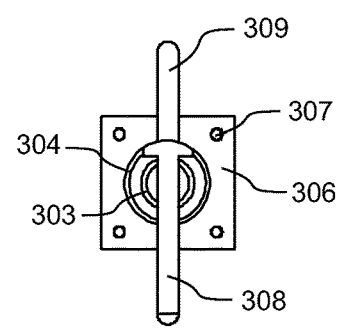
FIG. 12 is a view from the opposite end of the arm.

With reference to FIGS. 1-5 the present invention may relate to components forming part of a modular scaffolding system, parts of which are already known. In FIG. 1 for example there is shown a scaffold structure 100 that comprises of a plurality of standards 1. The standards 1 preferably consist of a metal pipe that, at preferably regular intervals, has secured thereto a rosette 6. The rosette 6 may be made from a sheet metal 6 and is preferably substantially planar. The rosette 6 includes a central aperture 7 which is of a shape and configuration to snugly fit about the pipe of the standard 1. The rosette 6 may be welded to the pipe of the standard 1 to become securely fastened thereto. The rosette 6 may include a plurality of apertures 8. The apertures 8 may for example be slots that are positioned to radiate away from the pipe of the standard 1 and are preferably equispaced about the pipe of the standard 1. The slots 8 are preferably elongate slots and may be substantially rectangular in plan shape. Alternative shapes of such rosette apertures may be provided by the rosette.

Able to form part of the scaffolding structure 100 are a plurality of ledgers 2. The ledgers may comprise of linear elongate pipes U or RHS sectioned members. The ledgers 2 have connection heads at each end that are of a shape and configuration to allow for the ledger to become secured at an aperture of a rosette of a standard. Such a head may comprise projections 10. These projections 10 are of a shape to allow for these to be located into a slot 8 of a rosette 6. Each projection 10 may be welded to the end of the pipe section of the ledger. The projection 10 presents a leg 11 that can be received into a slot 8 of a rosette 6. The leg 11 may be a projection. The leg may be tapered so that it can be conveniently located into the slot and become wedged to the standard. An aperture 12 may be provided through the leg 11 to allow for a fastener to extend through. Such can ensure that the ledger cannot be removed from the rosette 6. The fastener may for example be a split pin or ring or other arrangement that can help secure the ledger to the rosette 6. Preferably the leg is made of a sheet metal of a thickness that is substantially the same as the width of the slot 8 of the rosette. This allows for the leg to have a very snug fit in a slot of a rosette and thereby become secured without being able to swivel relative to the standard. This allows for a simple erection of a scaffold structure.

Figure 3:
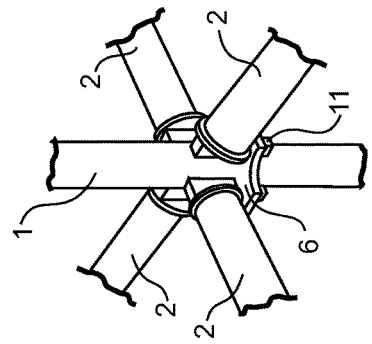
FIG. 3 is a ledger that may be used in the modular system.
Figure 5:
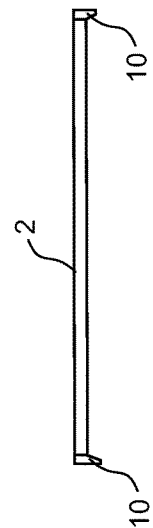
FIG. 5 is a perspective view showing a scaffolding standard to which there is connected four separate ledgers.
Figure 2:
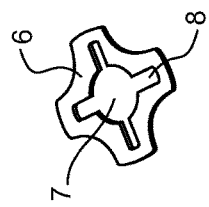
FIG. 2 is a perspective view of a rosette that may be affixed to the standard.
Figure 4:
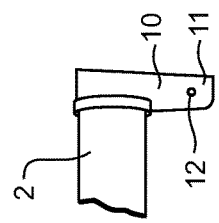
FIG. 4 is a close up view of an end of a ledger.

As can be seen in FIG. 5 a plurality of ledgers may be engaged at a single rosette of a standard 1 to each radiate away from the standard 1 in predefined and different directions.

With reference to FIG. 6-8 there is shown a scaffold structure 200 located intermediate of two walls 201 and 202 of a building. The two walls may be facing walls or may be walls that are at an angle to each other. In the example shown in FIG. 6-8, the two walls shown in FIG. 6 are facing walls of an elevator shaft. FIG. 7 illustrates a plurality of walls of an elevator shaft 203 and within which the scaffold structure 200 is erected.

In order to provide lateral stability to the scaffold structure the scaffold structure is supported, at discrete locations by a plurality of extendable lateral support arms 300. Such support arms 300 may be provided at a plurality of discrete locations to extend between the scaffold structure 200 and an adjacent wall 201 (etc). The support arm is preferably adjustable in length.

In a preferred form the support arm comprises of two arm members, a first arm 302 and a second arm 303. The two arms are threadingly coupled together. In the preferred form the second arm 303 is a threaded rod whereas the first arm 302 includes an internally threaded region 304 that can receive the threaded rod 303. The first arm 302 includes a first head 305 that is presented at a first distal end of the support arm 300 for engagement to a wall or other part of a building structure. The first head 305 may for example be a plate 306 having a plurality of apertures 307 through which fasteners can extend to engage to the wall of a building structure.

The second arm 303 includes a second head 307 that is configured and adapted to be able to conveniently engage and be secured to the scaffold structure 200. The second head is preferably defined at the second distal end of the support arm 300. The second head 307 preferably comprises a tongue 308. The tongue is preferably planar and of a width that is complimentary to the width of a slot of a rosette of modular scaffolding system with which the support arm may be used. As can be seen the tongue 308 is of a shape to allow for the tongue to drop into the aperture of a rosette and thereat become secured to a standard of a scaffold structure.

It is desirable for the support arm to become secured to a scaffold structure not at a ledger but at a standard and preferably at a rosette of a modular scaffold system standard to allow for a lateral force transfer to occur to the scaffold structure via the support arm to the wall of the building structure. Indeed in a preferred form the support arm is engaged to a standard at a rosette at which ledgers also extend from as part of the scaffold structure so as to provide a solid anchoring point with little or no flexibility in the standard at the rosette by virtue of other scaffolding components being connected thereto. FIG. 7 shows a preferred assembly of a scaffold structure where support arms of the present invention are utilised. It is desirable for two support arms to extend from a rosette, one support arm extending in one direction from the scaffold structure to an adjacent wall and a second support arm extending substantially perpendicular thereto and extending to an adjacent wall of the building structure. The adjacent walls are preferably at right angles to each other. Alternatively the first and second support arms could extend to the same wall and triangulate with the wall and/or the scaffold structure.

In a preferred form the support arm 300 comprises of two arm members 302 and 303. These arm members are preferably elongate and preferably extend coaxial relative to each other.

In the preferred form the two arms 302 and 303 are directly engaged to each other. Alternatively they may be engaged with each other but wherein an intermediate member may be provided. Such an intermediate member may be a separate threaded component that engages to threaded portions of the first and second arm 302 and 303 and thereby form a turn buckle style arm. This allows for the intermediate member to be rotated when the first and second arms are secured in place, yet allow the overall length of the support arm 300 to be adjusted. A telescopic configuration is also anticipated which may or may not include lock out features to allow the support arm to be adjustable yet still be established in a rigid configuration. Such may provide for a spring biased telescoping or similar.

In use, the preferred form of the support arm may be adjusted in length by relative rotation of the threaded components of the support arm 300 so that the distance between the first and second distal ends of the support arm can be varied to establish an overall length that is suitable to allow for the support arm 300 to extend between the scaffold structure and an adjacent wall and become coupled to both. Alternatively the support arm 300 may first be engaged to a rosette of a standard and then its length may be adjusted until the first head 305 presses against an adjacent wall. Alternatively the first head may first be secured to an adjacent wall and the length of the support arm 300 may then be adjusted so that it can span between the adjacent wall and the scaffold structure. Handles 309 may be provided to one or both of the first and second arm 302 and 303 to facilitate the relative rotation of the threaded components to allow for the length to be adjusted.

The use of a plurality of support arms of the present invention can allow for a scaffold structure to obtain lateral support and also be clampingly engaged between facing or adjacent walls of a building. Pressure can be applied via the support arms by adjustment of the threaded components to change the length of a or each of any of the support arms. This can allow for a force to be applied to the scaffold structure to ensure a rigid connection is established between the adjacent walls of the building and the scaffold structure.

Whilst the support arm herein described is preferably utilised where a scaffold structure is desirous of being supported relative to two facing or otherwise adjacent walls so as to allow for a plurality of support arms to be utilised, it is also envisaged that the support arm may be utilised for supporting a scaffold structure merely adjacent one planar wall of a building. The support can be adjusted so as to ensure that if substantially vertical orientation of a or the vertical standards is maintained by virtue of providing lateral support to the scaffold structure from the building.

Figure 13:
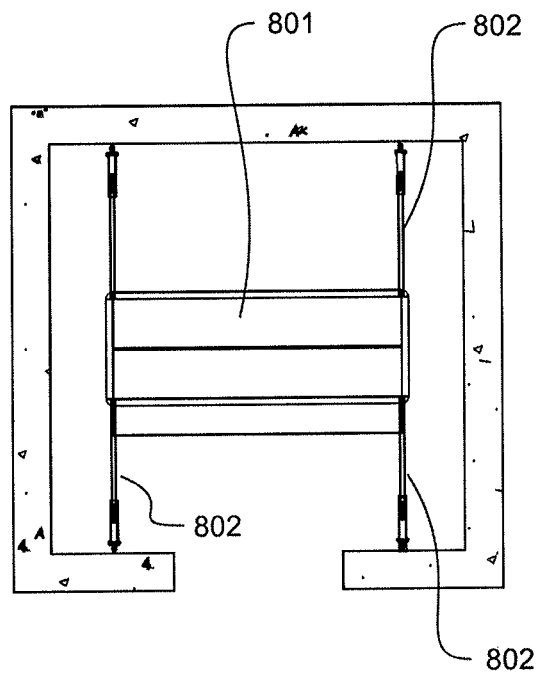
FIG. 13 shows a plan view down an elevator shaft for example, where a service cart or lift is positioned, the cart carrying extendible arms that project to each make contact with a wall of the shaft such that in concert they can operate to provide lateral stability to the cart.
Figure 14:
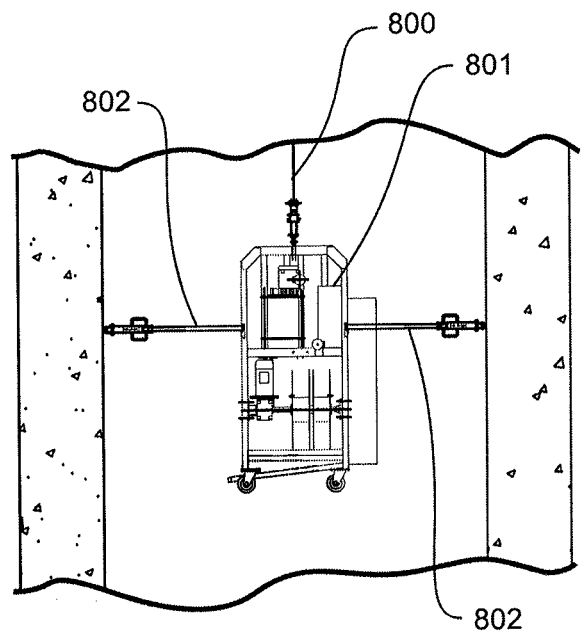
FIG. 14 shows the cart, suspended from a cable inside the lift shaft, in a side cross sectional orientation.
Figure 17:
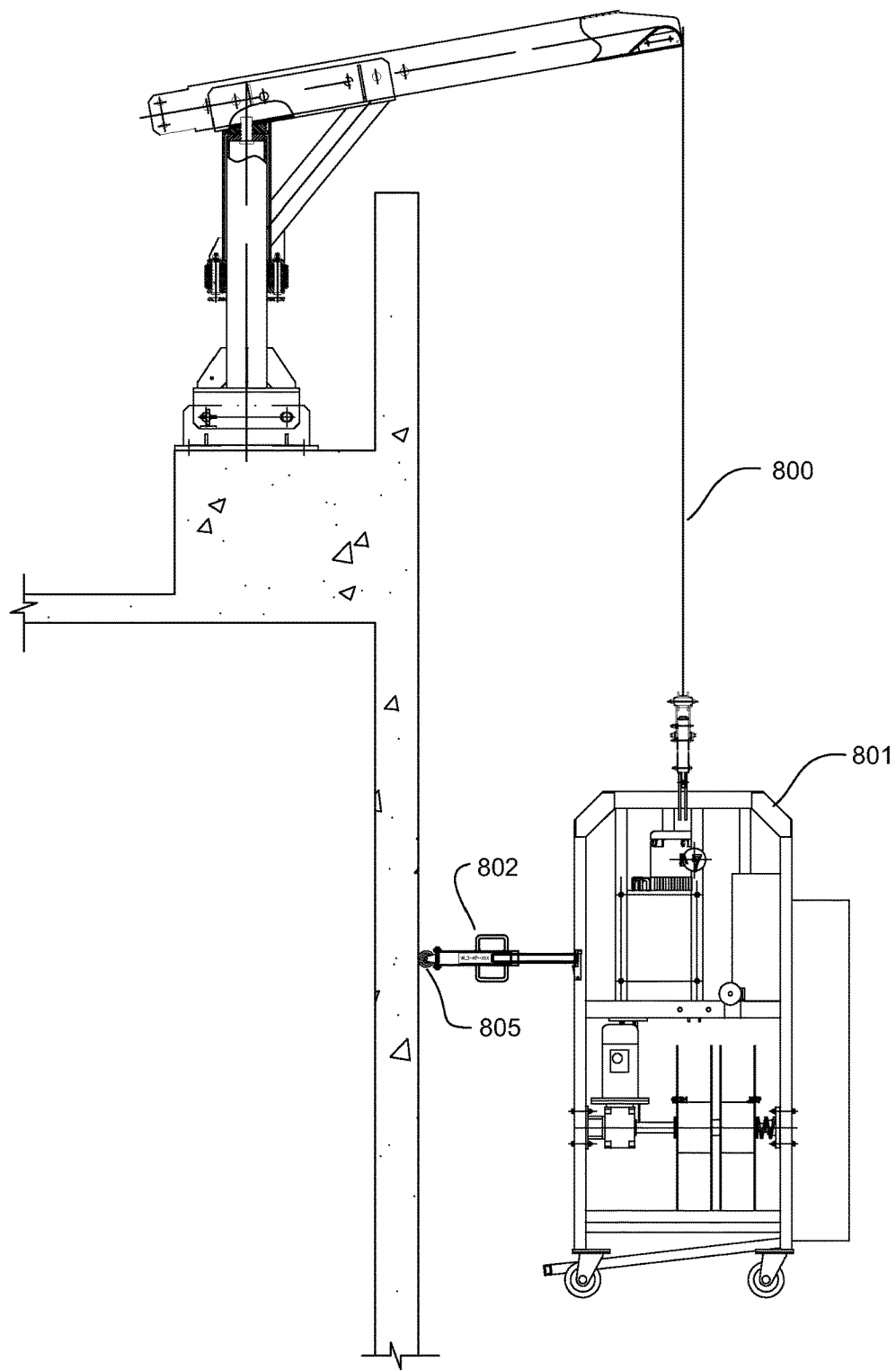
FIG. 17 is a side view of part of a building showing a swing stage or service cart, suspended adjacent the building and showing how the extendible arm of FIGS. 15 and 16 may be utilised for the purposes of keeping separation between the building and the swing stage.

The support arm of the present invention may also be utilised in a mode where it is secured to a service car or swing stage that maybe suspended adjacent a building wall. As shown in FIG. 13 or 14 a service car is shown inside an elevator shaft, the service car suspended by a cable 800. A plurality of support arms 802 may be secured to and project away from the service car 801 to as to extend to an adjacent wall of the shaft. Such a configuration can allow for the service car to get lateral stability as it travels up and down or is stationary inside the lift shaft. As a result workers in the car can perform functions without the lift car swaying relative the building. So whilst in a preferred form the support arm may be used with scaffolding, it can be seen that other applications for the support arm exist. Indeed as shown in FIG. 17, the service car or swing stage 801 may be suspended by a crane exterior of a building and via a cable 800. The support arm may project from the service car towards a face of the building and contact the building. A plurality of support arms may be so mounted and travel with the service car as it moves up and down.

Figure 15:
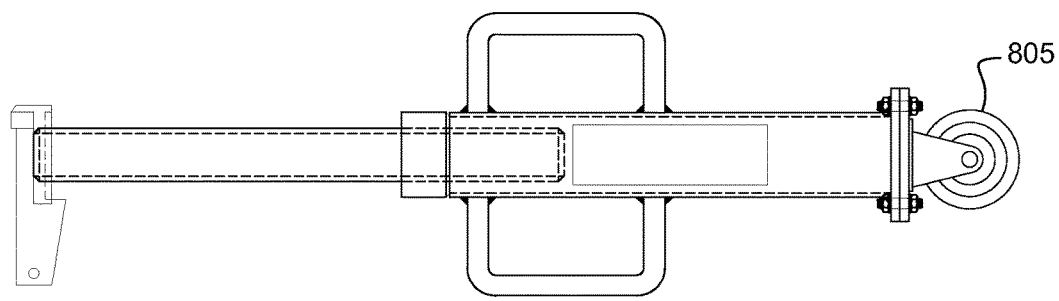
FIG. 15 is a side view with hidden detail showing of a variation of the extendible arm that may be utilised in the application as described with reference to FIGS. 13 and 16 and 17.
Figure 16:
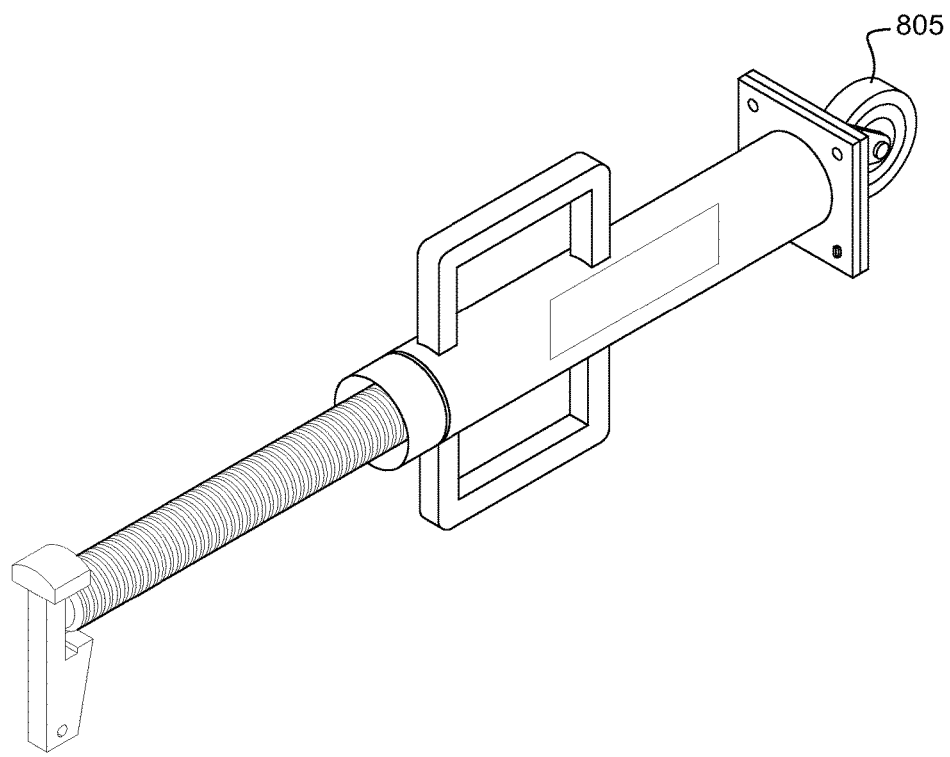
FIG. 16 is a perspective view of the extendible arm of FIG. 15.

To ensure that such up and down movement is not impaired and/or causes no or little damage to the building, the support arm may include a contact roller 805. This is more clearly seen in FIGS. 15 and 16. The contact roller may include a wheel that has a tire or other suitable material on it that make if compatible with the surface over which it is to roll. The roller may be mounted in a castor like manner so that it can swivel. This may be important where for example lateral stability in a direction parallel to the adjacent building surface is not able to be achieved. The service car may for example sway from side to side parallel to the building and a castor wheel arrangement can allow for the contact roller to passively adjust its orientation to allow for up and down rolling contact as well as side to side rolling contact with the building.

The tires may be pneumatic tires. This allows for some impact damage and dampening to occur if a swing stage is moved away from the building and then comes back at the building. In addition or alternatively, the two arm portions of the support arm may be able to move relative to each other in a manner to that provides such shock absorption. A spring, ram or other element may be included sot that the two arm portions can displace relative to each other upon the application of a force.

The invention claimed is:

1. An extendible lateral support arm configured to span between a building structure and an adjacent scaffold structure, said support arm comprising:
    a first arm threadingly coupled to a second arm in order to be displaceable relative to one another, the first arm and the second arm are coaxial relative to one another, the first arm terminating into a first end of said lateral support arm, the second arm terminating into a second end of said lateral support arm, wherein a distance between the first end and the second end is variable; and,
    at said first end, said first arm having a first head that comprises a contact roller, wherein said adjacent scaffold structure is configured to move vertically relative to said building structure to cause the contact roller to roll on a surface of said building structure; and,
    at said second end, said second arm having a second head that is configured to be secured to said adjacent scaffold structure, wherein said second head comprises a tongue adapted and configured to secure said support arm to said adjacent scaffolding structure, said tongue extending in a direction transverse to a longitudinal axis of said lateral support arm to a free end thereof, and said tongue having an edge that tapers from an intermediate portion thereof to said free end thereof; and,
    said adjacent scaffold structure comprises a plurality of vertical standards, wherein each one of the vertical standards has a respective rosette, the vertical standards being interconnected by horizontal ledgers, wherein each one of the horizontal ledgers is engaged to at least one of said respective rosettes, and wherein said tongue is adapted and configured to be secured into at least one of the rosettes so that said first and second arms are secured to the adjacent scaffold structure to project laterally and horizontally away from said adjacent scaffold structure in a direction toward said building structure.

2. The extendible lateral support arm as claimed in claim 1, wherein the first arm and the second arm are telescopically engaged.

3. The extendible lateral support arm as claimed in claim 1, wherein the first and second arms are arranged to form a turnbuckle.

4. The extendible lateral support arm as claimed in claim 1, further comprising a lever that can be grasped by a person to assist in providing leverage during rotation of one of said arms relative to to the other of said arms.

5. The extendible lateral support arm as claimed in claim 1, wherein said first head is adapted and configured to be secured to said building structure.

6. The extendible lateral support arm as claimed in claim 1, wherein the contact roller is a castor roller.

7. The extendible lateral support arm as claimed in claim 1, wherein the contact roller is a castor wheel.

8. A construction comprising a building structure, an adjacent structure, and an extendible lateral support arm spanning between said building structure and said adjacent structure, said support arm comprising at least a first arm and at least a second arm threadingly coupled to be displaced relative to each other, said second arm extending from and coaxial with said first arm, said first arm terminating into a first end of said support arm, said second arm terminating into a second end of said support arm, a distance between said first end and said second end being variable,
    wherein the first end of said first arm presents a first head configured to make contact with said building structure, and wherein the second end of said second arm presents a second head secured to said adjacent structure, said second head and said second arm being arranged so that said second arm projects laterally away from said adjacent structure toward said building structure, and said support arm is rigidly connected to said adjacent structure to permit lateral force transfer from said adjacent structure to said building structure, and
    wherein the adjacent structure is a scaffold structure, said scaffold structure comprises a plurality of vertical standards, wherein each one of said plurality of vertical standards having a rosette, the vertical standards being interconnected by horizontal ledgers, wherein each one of the plurality of the horizontal ledgers is engaged to at least one of said rosettes, wherein said first head has a roller adapted and configured to roll along said building structure as the scaffold structure moves vertically there-along, and wherein said second head comprises a connector adapted and configured to become secured to at least one of said rosettes.

9. The construction as claimed in claim 8, wherein said first head is configured to be secured to said building structure.

10. The construction as claimed in claim 8, wherein said first head comprises a mounting plate that comprises at least one aperture through which a fastener is configured to extend to secure said first head to said building structure after said roller has been detached.

11. The construction as claimed in claim 8, wherein said first and second arms are arranged to form a turnbuckle.

12. The construction as claimed in claim 8, wherein at least one of said first arm and said second arm of said support arm has a lever that can be grasped by a person to provide leverage during rotation relative to the other one of said first arm and said second arm.

13. The construction as claimed in claim 8, wherein the first arm comprises a pipe that includes an internally presented thread and said second arm comprises a threaded rod that is able to extend into said pipe.

14. The construction as claimed in claim 8, wherein the adjacent structure is able to move relative to said building structure and said support arm is engaged to said adjacent structure and carried thereby as the adjacent structure moves relative to said building structure, the first end of the support arm being configured to engage said building structure at least periodically.

15. The construction as claimed in claim 14, wherein said scaffold structure is configured to form a selected one from the group consisting of a swing stage and a service car.

16. The construction as claimed in claim 14, wherein the adjacent structure carries another support arm.

17. The construction as claimed in claim 14, wherein said roller comprises a contact roller.

18. A scaffolding system that comprises:
a plurality of standards and a plurality of ledgers configured to connect to form a scaffold structure adjacent to a wall of a building, and at least one extendible arm comprising a first arm and a second arm, said second arm coaxially extending from said first arm, said first arm having a first end configured to make contact with said wall and said second arm having a second end which is securable to said scaffold structure, said first and said second arms threadingly coupled together to allow a distance between said first and said second ends to vary, the at least one extendible arm being configured to tie said wall to said scaffold structure so as to create a lateral support to said scaffold structure from said wall, said second arm being arranged to project laterally away from said scaffold structure toward said building when said second end is secured to said scaffold structure, wherein said at least one extendible arm, when secured to said scaffold structure, rigidly connects said scaffold structure to said wall of said building to allow for lateral force transfer from said scaffold structure to said wall of said building;
the scaffolding system further comprising another extendible arm, wherein each one of the another extendible arm and the at least one extendible arm respectively has a roller configured to contact and vertically roll along a respective wall of two opposite walls of the building as the scaffold structure is raised and lowered, each one of said at least one extendible arm and said another extendible arm respectively has a variable length configured to create a lateral clamping force to be exerted on said scaffolding structure to thereby laterally support said scaffold structure between said two opposite walls,
wherein each one of said standards presents a plurality of spaced rosettes along a length thereof, each one of said rosettes defining a coupling zone, said second end of said second arm including a coupling that is complementary to each of said coupling zones of said rosettes to allow said coupling to be secured to said rosettes.

19. The system as claimed in claim 18, wherein at least one of the rosettes comprises a sheet metal body through which a plurality of elongate slots extend, each slot extending radially, said coupling comprising a tongue that can nest in each said slot.

20. The system as claimed in claim 18, wherein the system provides the standards and ledgers to create a single bay 3 dimensional scaffold structure that in plan view is substantially quadrilateral, and further comprising two additional extendible arms, each of said four extendible arms extending outwardly away from a respective side of said scaffold structure to a respective proximate wall of an elevator shaft.

21. The system as claimed in claim 20, further comprising seven additional extendible arms, two of said extendible arms extending outwardly away from said scaffold structure to one of said proximate walls of said elevator shaft.

22. A method of erecting a system, the method comprising: providing the scaffolding system of claim 18,
erecting, at least in part, the scaffolding structure with said standards and said ledgers; and,
connecting said at least one extendible arm to said scaffolding structure.

* * * * *